United States Patent
Gillett et al.

(10) Patent No.: US 9,886,039 B2
(45) Date of Patent: Feb. 6, 2018

(54) SYSTEM AND METHOD FOR AVOIDING INADVERTANT ENTRY INTO AN UNSAFE VERTICAL DESCENT SPEED REGION FOR ROTORCRAFT

(71) Applicant: Bell Helicopter Textron Inc., Fort Worth, TX (US)

(72) Inventors: Luke D. Gillett, Grapevine, TX (US); Joseph M. Schaeffer, Cedar Hill, TX (US); Christopher M. Bothwell, Grapevine, TX (US); Robert Worsham, Weatherford, TX (US); Jillian Alfred, Fort Worth, TX (US); Sung Kim, Bedford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 375 days.

(21) Appl. No.: 14/623,382

(22) Filed: Feb. 16, 2015

(65) Prior Publication Data
US 2015/0232176 A1    Aug. 20, 2015

Related U.S. Application Data

(60) Provisional application No. 61/940,536, filed on Feb. 17, 2014.

(51) Int. Cl.
*G05D 1/08* (2006.01)
*G05D 1/06* (2006.01)
(Continued)

(52) U.S. Cl.
CPC .......... *G05D 1/0607* (2013.01); *B64C 27/10* (2013.01); *B64C 27/16* (2013.01); *B64C 27/605* (2013.01)

(58) Field of Classification Search
CPC .......................... G05D 1/0607; G05D 1/0623
See application file for complete search history.

(56) References Cited

U.S. PATENT DOCUMENTS

| 4,603,389 A * | 7/1986 | Griffith ............... G05D 1/0669 244/17.13 |
| 2005/0001092 A1 * | 1/2005 | Kisor ..................... B64C 27/28 244/17.13 |

(Continued)

OTHER PUBLICATIONS

U.S. Appl. No. 14/297,114, filed Jun. 5, 2014, having inventors Joseph M. Schaeffer, Jignesh Patel, and Eric O'Neal.

*Primary Examiner* — Igor Kershteyn
*Assistant Examiner* — Kayla McCaffrey
(74) *Attorney, Agent, or Firm* — Lightfoot & Alford PLLC

(57) ABSTRACT

A flight control system having a control law, the control law operable to generate a modified pitch command, the modified pitch command representing a greater amount of collective pitch compared to an amount of collective pitch generated by a first pitch command, the modified pitch command being generated because a vertical descent speed of the rotorcraft at a given forward airspeed is greater than a threshold. A method of avoiding entry into an undesired vertical descent speed region during operation of a rotorcraft, including measuring a forward airspeed; evaluating a vertical descent of the rotorcraft; and generating a modified collective pitch command in respond to a first collective pitch command having a collective pitch value that would cause the rotorcraft to experience a vertical descent rate greater than a threshold value at the forward airspeed of the rotorcraft.

17 Claims, 4 Drawing Sheets

(51) Int. Cl.
*B64C 27/10* (2006.01)
*B64C 27/16* (2006.01)
*B64C 27/605* (2006.01)

(56) References Cited

U.S. PATENT DOCUMENTS

2005/0151672 A1* 7/2005 Augustin ................ B64C 27/56
340/965
2009/0089006 A1* 4/2009 Certain ................ B64C 27/006
702/144

* cited by examiner

SYSTEM AND METHOD FOR AVOIDING INADVERTANT ENTRY INTO AN UNSAFE VERTICAL DESCENT SPEED REGION FOR ROTORCRAFT

BACKGROUND

Technical Field

The embodiments of the present disclosure relate to flight control systems for rotorcraft, such as helicopters.

Description of Related Art

There is potential for rotorcraft to get into a dangerous area of the flight envelope where vertical performance is compromised if excessive vertical velocities are maintained at low airspeeds. Traditionally, aircraft flight manuals have warned aircrew of this potential and pilot training has taught them to avoid entering such situations. One disadvantage of the conventional procedure is that it is not always obvious to the aircrew that this situation has occurred, especially in poor visibility, at times of high workload (such as approach to landing) or if auxiliary systems such as autopilots are mishandled and cause inadvertent changes in forward or vertical speed. This can result in control limitations and restricted ability to arrest the high descent rates.

There is a need for an improved flight control system.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
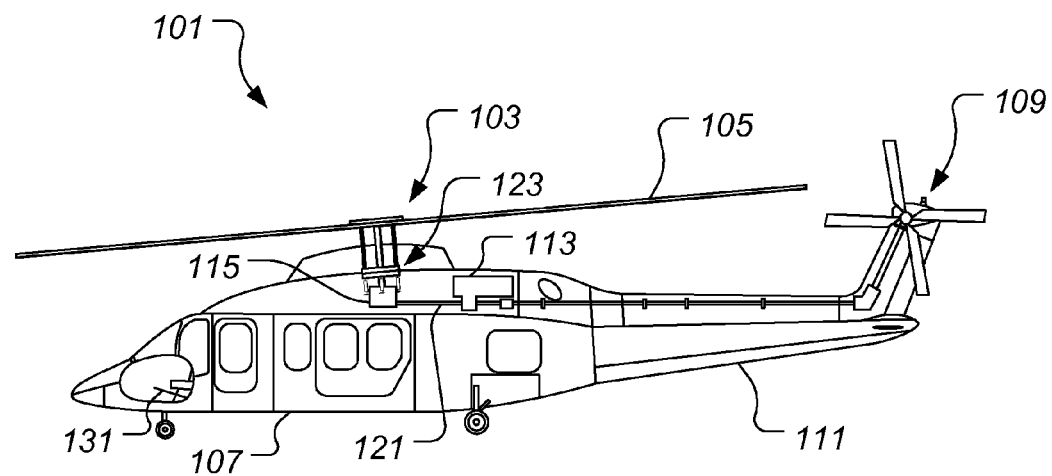
FIG. 1 is a side view of an rotorcraft, according to one example embodiment.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast.

Rotorcraft 101 can include a collective stick 131 that is configured to allow a pilot to make a collective input to collectively change the pitch of the rotor blades 105. The collective stick 131 can take on any variety of implementation specific configurations. In one embodiment, collective stick 131 is a lever and a collective input is made by lifting up or pushing down the collective stick 131. In such an embodiment, lifting up the collective stick 131 can cause an increase a vertical lift of the rotorcraft 101 by increasing the pitch of each rotor blade 105 in unison. Similarly, pushing down the collective stick 131 can cause a decrease in vertical lift by decreasing the pitch of each rotor blade 105 in unison. It should be appreciated that collective stick 131 can take on other implementation specific embodiments and collective pitch inputs can be made by other mechanisms and movements.

Rotorcraft 101 is merely illustrative of the wide variety of aircraft and vehicles that are particularly well suited to take advantage of the method and system of the present disclosure. It should be appreciated that other aircraft can also utilize the method and system of the present disclosure.

Figure 2:
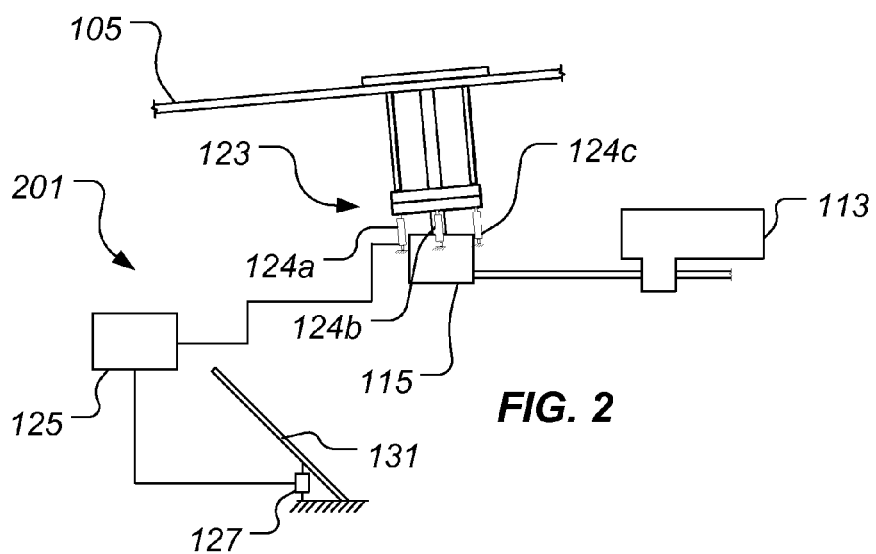
FIG. 2 is a schematic view of a system, according to one example embodiment.

Referring now also to FIG. 2 in the drawings, a system 201 is illustrated in conjunction with rotorcraft 101. It should be appreciated that though system 201 is illustrated with regard to rotorcraft 101, system 201 is also implementable on other aircraft as well. Further, it should be appreciated that system 201 can be implemented in a wide variety of configurations, depending in part on the flight control configuration of the aircraft.

System 201 is particularly well suited for implementation in aircraft having a fly-by-wire flight control computer, such as flight control computer 125; however, a partial authority fly-by-wire aircraft can also utilize system 201. For example, system 201 can be utilized with a flight control system having collective actuators 124a, 124b, and 124c that can receive commands from a trim motor, autopilot system, or any other system that allows collective commands to be realized by collective actuators 124a, 124b, and 124c. A trim motor 127 is schematically illustrated in conjunction with collective stick 131. Trim motor 127 can be any mechanism(s), device(s), system(s), etc., that can receive and commands from collective stick 131 and communicate those commands, via flight control computer 125, to one or more collective actuators, such as collective actuators 124a, 124b, and 124c. Further, Trim motor 127 can be any mechanism(s), device(s), system(s), etc., that can selectively impart forces, resistance, movements, etc. to collective stick 131.

Figure 3:
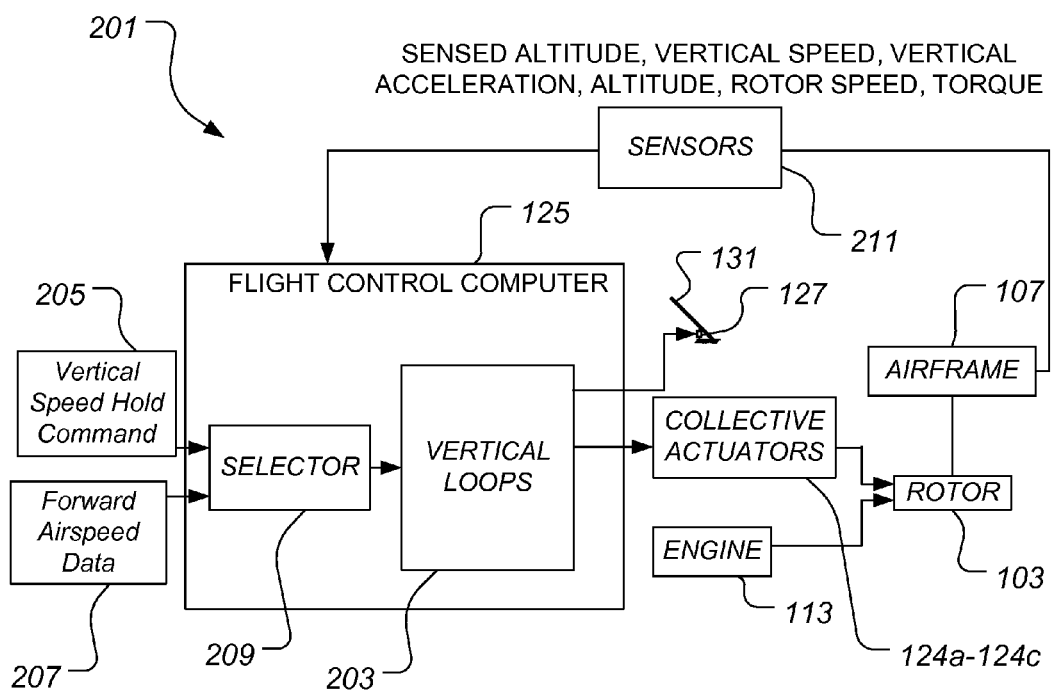
FIG. 3 is a schematic view of a system, according to one example embodiment.

Referring now also to FIG. 3, the system 201 of the present disclosure relates to a collective axis stability augmentation system for of rotorcraft 101, the augmentation system can include forward airspeed sensing and vertical speed sensing, and be at least partially integrated with a flight control computer 125. In one embodiment, system 201 is incorporated into a fly by wire control system of rotorcraft 101. An attempted flight maneuver into a dangerous part of the flight envelope can result in system 201 automatically raising the collective pitch of rotor blades 105 to avoid the potentially dangerous situation, but can be overridden by the pilot if desired.

System 201 can include controls laws, which are illustrated as vertical loops 203. Vertical loops 203 can include vertical axis control laws configured to make control commands so that the rotorcraft 101 can achieve a desired vertical axis state, such as vertical speed or vertical altitude, for example. Furthermore, the vertical loops 203 can adjust for differences between a commanded vertical state and an actual vertical state. One example can be if the rotorcraft 101 is directed to hold the rotorcraft 101 at a commanded altitude, but the rotorcraft experiences a sudden downward gust of wind, then the vertical loops 203 will generate commands to collective actuators 124a-124c in order to increase pitch (therefore thrust) in order to maintain the commanded altitude.

A vertical speed hold command 205 is a command that can be generated by a pilot or an autopilot system. In one embodiment, a pilot vertical speed hold command can be a physical positioning of the collective stick 131 by the pilot that produces a descent rate. In another embodiment, the vertical speed hold command 205 can be an autopilot system that is automatically flying the aircraft. For example, an autopilot system can attempt to create an approach to a landing site and as a result make a vertical speed hold command 205. One example quantification of the descent rate can be a feet per minute (fpm) descent rate. For example, a −2500 fpm is a greater vertical axis descent rate than a −800 fpm descent rate.

A forward airspeed data 207 is data pertaining to the forward airspeed of the rotorcraft 101. In one embodiment, forward airspeed data 207 is real time data measured from a sensor 211, such as a pitot probe which can convert ram air into a forward airspeed measurement. In another example embodiment, forward airspeed data 207 can be derived from GPS satellite data, for example.

Figure 4:
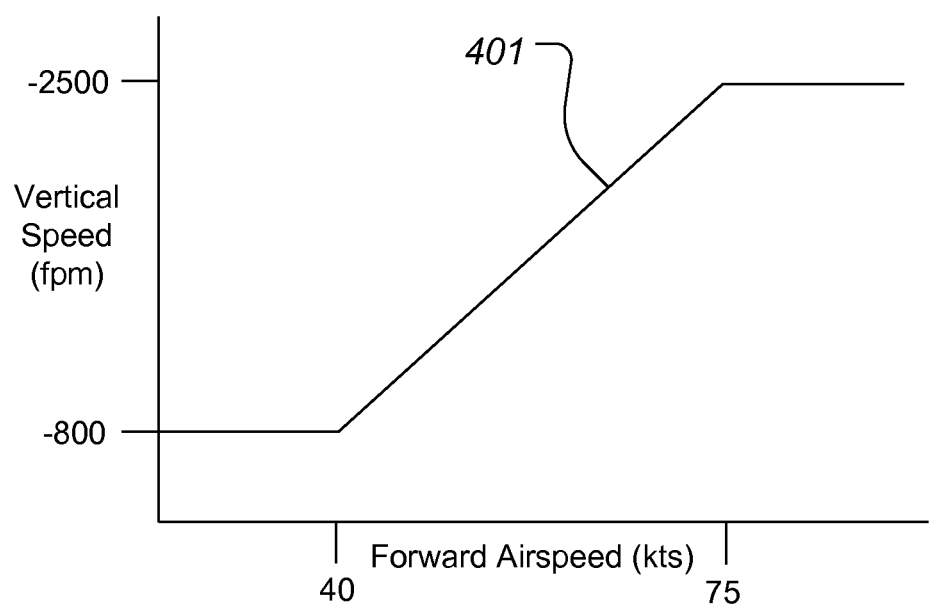
FIG. 4 is a graphical representation of a threshold, according to one example embodiment.

A selector 209 is configured to analyze the vertical speed hold command 205 and the forward airspeed data 207 and either allow the vertical speed hold command 205 to proceed to the vertical loops 203 and further as a pitch command to the collective actuators 124a-124c, or alternatively modify the vertical speed hold command in way that increases collective pitch so that the rotorcraft 101 does not experience a vertical axis descent rate beyond a threshold. Referring now also to FIG. 4, an example threshold 401 is illustrated. Threshold 401 is a function of a vertical speed and forward airspeed. The threshold 401 is a maximum allowable descent in the vertical axis for a given forward airspeed. In the example embodiment, when the rotorcraft 101 has a forward airspeed of 40 knots (kts) or less, then system 201 will impede a collective pitch position that would otherwise result in a vertical axis descent greater than 800 fpm. As the forward speed of rotorcraft 101 increases, the threshold 401 of the vertical speed descent also increases. Once the forward speed of rotorcraft 101 obtains 75 knots, the threshold 401 of the vertical speed descent is capped at 2500 fpm. It should be appreciated that the illustrated threshold 401 is merely an example of an implementation specific threshold curve.

Selector 209 is configured to identify a vertical speed hold command 205 that would exceed the threshold 401, and replace the vertical speed hold command 205 with the threshold value for the given forward airspeed. The threshold value command is received and processed by the vertical loops 203 control laws and further commanded to collective actuators 124a-124c. Further, commands can be further sent from vertical loops 203 to trim motor 127 so that the collective stick 131 is impeded from decreasing collective pitch any further than the threshold value 401. In one embodiment, the pilot can override system 201 and decrease collective pitch beyond threshold value 401 for a given forward airspeed by overcoming the impeding force on collective stick 131 by trim motor 127.

System 201 is advantageously configured such that attempted flight into the prohibited part of the flight envelope will result in the vertical speed hold command being modified to the threshold 401, which is a predetermined vertical speed limit at that particular forward airspeed. The system 201 is configured to not only modify the position of collective stick 131 to acquire the vertical speed threshold, but also to produce aural and/or visual alerts to the pilot. The pilot can override the vertical speed threshold 401 at anytime by apply force/displacement to the collective stick 131. As a result, the system 201 automatically modulates collective input to preclude the rotorcraft from inadvertently entering dangerously high vertical speed conditions that could otherwise result in a crash. One advantage of the system 201 of the present disclosure is that it is autonomous and does not require pilot awareness of the situation, which is one of the inherent dangers, and also reduces pilot workload.

Figure 5:
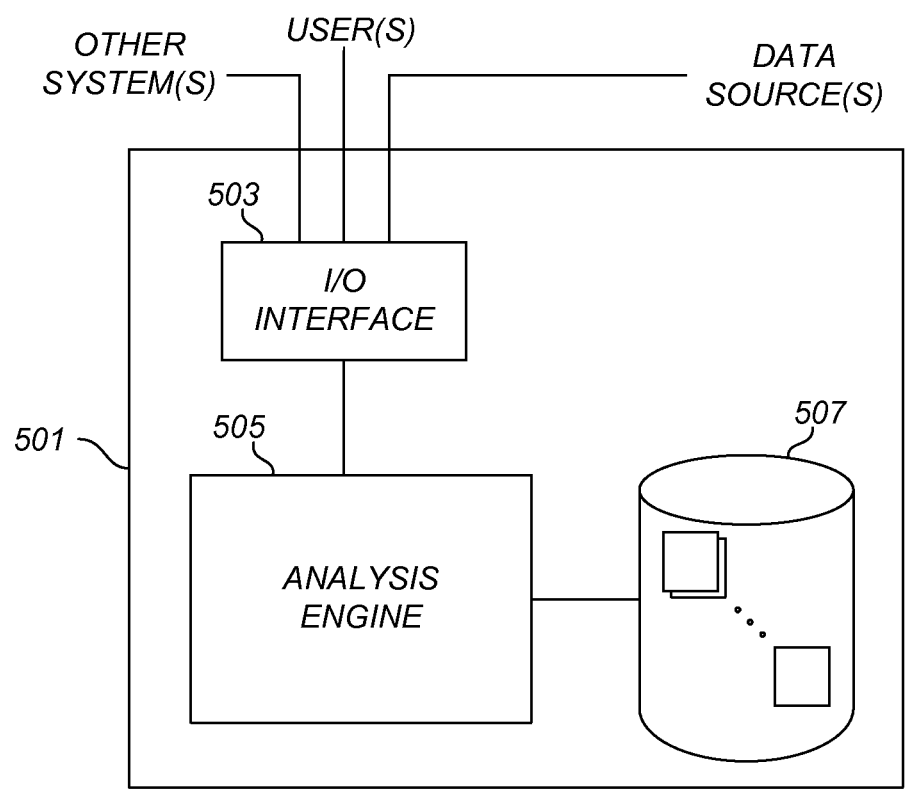
FIG. 5 is a schematic view of a computer system, according to one example embodiment.

Referring now also to FIG. 5, a computer system 501 is schematically illustrated. Computer system 501 can be configured for performing one or more functions with regard to the operation of system and method further disclosed herein. Further, any processing and analysis can be partly or fully performed by computer system 501. Computer system 501 can be partly or fully integrated with other aircraft computer systems.

The system 501 can include an input/output (I/O) interface 503, an analysis engine 505, and a database 507. Alternative embodiments can combine or distribute the input/output (I/O) interface 503, analysis engine 505, and database 507, as desired. Embodiments of the system 501 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 503 can provide a communication link between external users, systems, and data sources and components of the system 501. The I/O interface 503 can be configured for allowing one or more users to input information to the system 501 via any known input device. Examples can include a keyboard, mouse, touch screen, and/or any other desired input device. The I/O interface 503 can be configured for allowing one or more users to receive information output from the system 501 via any known output device. Examples can include a display monitor, a printer, cockpit display, and/or any other desired output device. The I/O interface 503 can be configured for allowing other systems to communicate with the system 501. For example, the I/O interface 503 can allow one or more remote computer(s) to access information, input information, and/or remotely instruct the system 501 to perform one or more of the tasks described herein. The I/O interface 503 can be configured for allowing communication with one or more remote data sources. For example, the I/O interface 503 can allow one or more remote data source(s) to access information, input information, and/or remotely instruct the system 501 to perform one or more of the tasks described herein.

The database 507 provides persistent data storage for system 501. While the term "database" is primarily used, a memory or other suitable data storage arrangement may provide the functionality of the database 507. In alternative embodiments, the database 507 can be integral to or separate from the system 501 and can operate on one or more computers. The database 507 preferably provides non-volatile data storage for any information suitable to support the operation of the system and method disclosed herein, including various types of data discussed further herein. The analysis engine 505 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the disclosure. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A flight control system for a rotorcraft, the rotorcraft having a rotor blade and a collective actuator for controlling a pitch of the rotor blade, the flight control system comprising:
    a computer having a control law, the control law operable to generate a modified pitch command, the modified pitch command representing only greater amounts of collective pitch compared to an amount of collective pitch generated by a first pitch command, the modified pitch command being selected to prevent a vertical descent speed of the rotorcraft from exceeding a maximum allowable vertical descent threshold at a given forward airspeed.

2. The system according to claim 1, wherein the first pitch command is made by a pilot.

3. The system according to claim 1, wherein the first pitch command is made by an autopilot system.

4. The system according to claim 1, wherein the modified pitch command is operable to impede a movement of a collective stick.

5. The system according to claim 1, wherein the modified pitch command is operable to impede a movement of a collective stick in a direction that would otherwise decrease collective pitch of the rotor blade.

6. The system according to claim 1, wherein the vertical descent speed is a predicted vertical descent speed.

7. The system according to claim 1, wherein the vertical descent speed is a real time vertical descent speed.

8. The system according to claim 1, wherein the forward airspeed is measured from a sensor.

9. The system according to claim 1, further comprising: a trim motor associated with a collective stick, the trim motor operable to generate a force that can selectively impede a movement of a collective stick in a direction that would otherwise decrease collective pitch of the rotor blade, the force being a resistant force that can be overcome by a pilot.

10. The system according to claim 1, the threshold being a plurality of predetermined maximum allowable vertical descent speeds for a plurality of predetermined forward airspeeds.

11. The system according to claim 10, wherein the predetermined maximum allowable vertical descent speeds increase as the plurality of predetermined forward airspeeds increase.

12. A method of avoiding entry into an undesired vertical descent speed region during operation of a rotorcraft, the method comprising:
    measuring a forward airspeed of the rotorcraft with a sensor;
    evaluating a vertical descent of the rotorcraft;
    generating a modified collective pitch command in response to a first collective pitch command having a collective pitch value that would cause the rotorcraft to experience a vertical descent rate greater than a maximum allowable vertical descent threshold value at the forward airspeed of the rotorcraft, the modified collective pitch command comprising only greater amounts of collective pitch compared to an amount of collective pitch generated by a first pitch command while at the forward airspeed of the rotorcraft.

13. The method according to claim 12, wherein the sensor is a pitot tube.

14. The method according to claim 12, wherein the step of evaluating the vertical descent is performed by evaluating data from a second sensor.

15. The method according to claim 12, further comprising:
   impeding a movement of a collective stick in response to the modified collective pitch command.

16. The method according to claim 12, wherein the first collective pitch command is generated by a pilot.

17. The method according to claim 12, wherein the first collective pitch command is generated by an autopilot system.

\* \* \* \* \*